Figure 1:
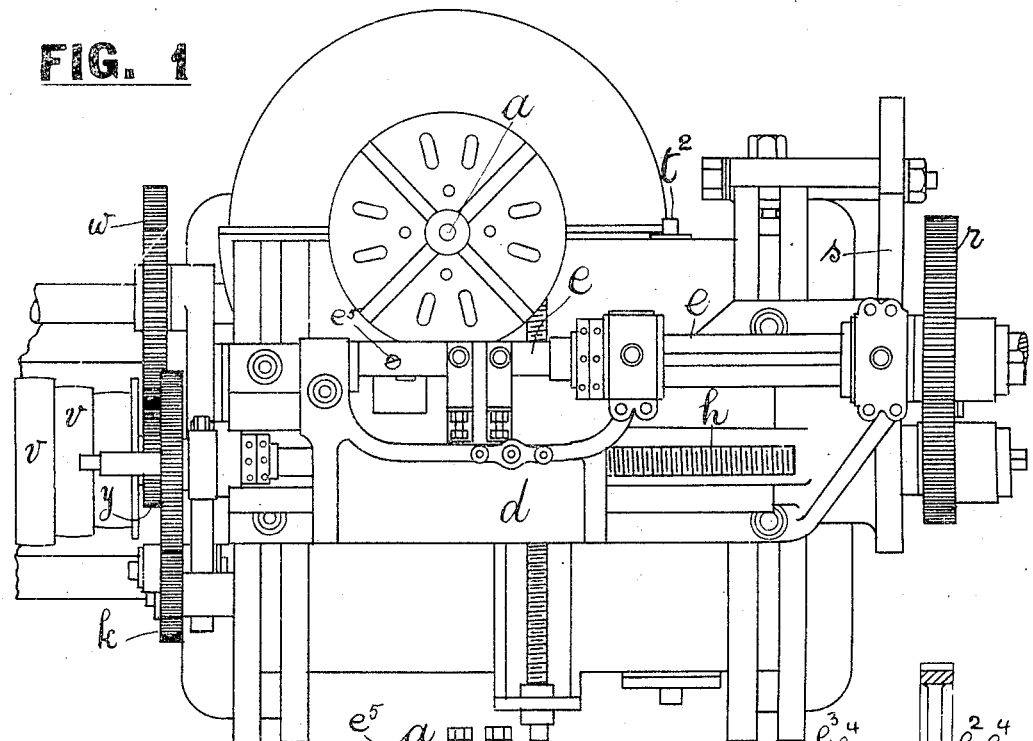

No. 812,441. PATENTED FEB. 13, 1906.
W. B. McLEAN.
WORM WHEEL CUTTING MACHINE.
APPLICATION FILED APR. 29, 1905.

3 SHEETS—SHEET 1.

Witnesses:
Arthur Gadd.
George Frederick Gadd.

Inventor
William Brown McLean
Per William Gadd
Attorney.

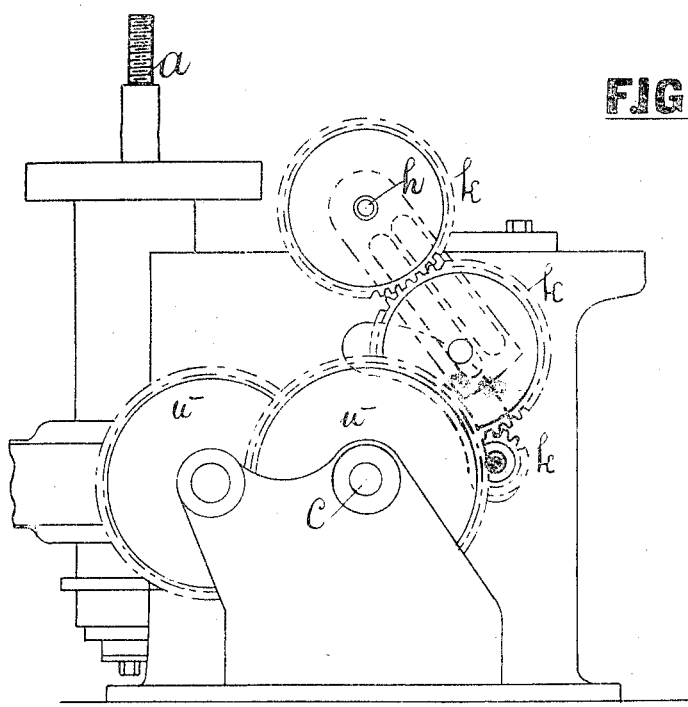
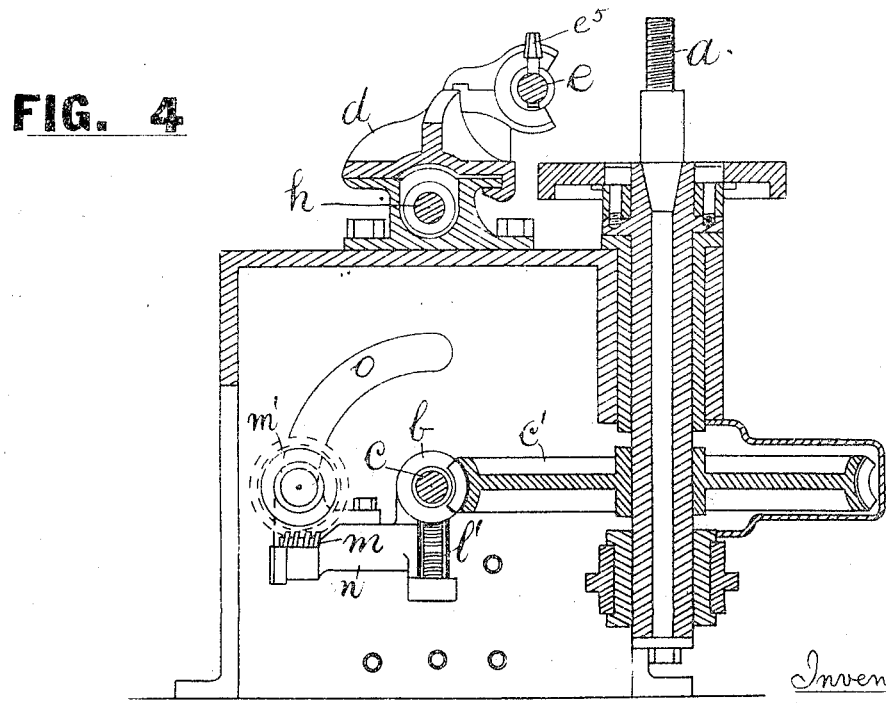

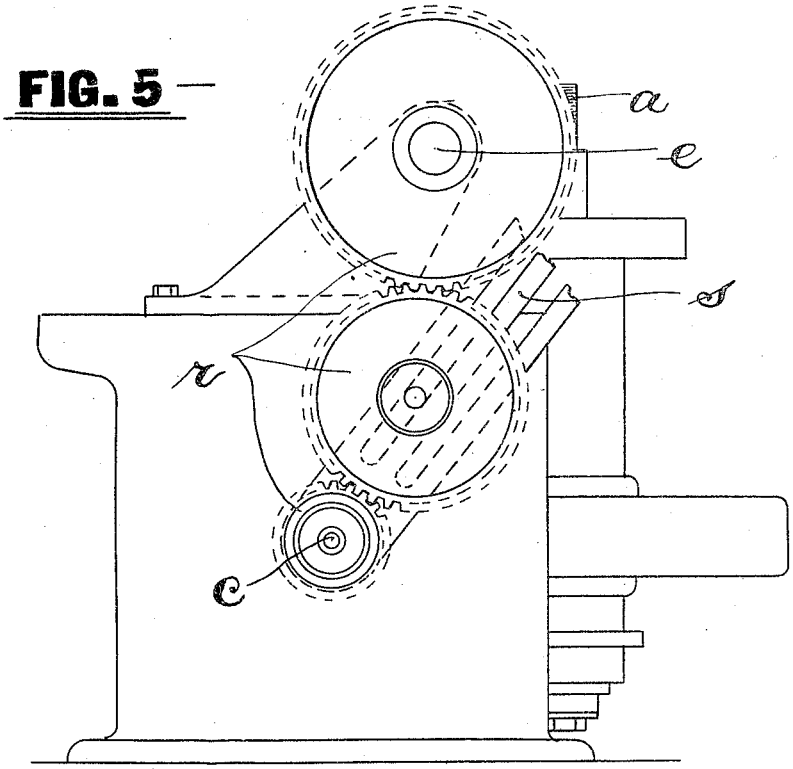

UNITED STATES PATENT OFFICE.

WILLIAM BROWN McLEAN, OF MANCHESTER, ENGLAND.

WORM-WHEEL-CUTTING MACHINE

No. 812,441.  Specification of Letters Patent.  Patented Feb. 13, 1906.

Application filed April 29, 1905. Serial No. 258,131.

*To all whom it may concern:*

Be it known that I, WILLIAM BROWN MC-LEAN, a subject of the King of Great Britain, residing at Union Bridge Ironworks, Roger street, Manchester, in the county of Lancaster, England, have invented a new and useful Improvement in Worm-Wheel-Cutting Machines, (for which I have made application for patent in Great Britain, No. 11,682, bearing date May 21, 1904,) of which the following is a specification.

The improvement relates to that class of worm-wheel-cutting machines wherein the axis of the cutter-bar relatively occupies a position corresponding to that of the worm which is ultimately to gear with the wheel when cut and in which the cutter (or it may be cutters) on such bar has a profile corresponding to that common to the threads on the said worm. In this class of machine the cutter-bar has means provided for giving it a traversing or feed motion along its axis in addition to a rotation about such axis, with the result that the cutter successively arrives at the positions occupied by the various parts of the worm-threads when in gear with the said wheel, so that the whole of the wheel-teeth are completely formed by the time the cutter emerges at the opposite end of the wheel-segment traversed by such cutter.

The object of the invention is to provide means for obtaining the required relative motions by the use of ordinary and suitable trains of gear-wheels and in a simple manner hereinafter to be described. To accomplish this and to effect my improvements, I mount the wheel to be cut upon a spindle capable of being rotated by gearing from the main driving-shaft, and the traversing mechanism I employ for the cutter-bar is such as will move the same along its axis through equal distances for equal rotations of the wheel operated upon, thus enabling the ratio existing between the rotations of the cutter-bar and the said wheel to be kept constant, which ratio is attained by the use of an ordinary train of gear-wheels. Such traversing mechanism may take the form of a guide-screw working in a nut fixed to a saddle or carriage carrying bearings in which the cutter-bar rotates. This guide-screw is connected by one of the trains of gear-wheels referred to to the spindle upon which the wheel being cut is mounted, while a second train of gear-wheels through which the cutter-bar is rotated connects the cutter-bar to the said spindle, and the gearing may be arranged so as to enable the machine to be driven from one main driving-shaft; but that the invention may be better understood I will, with the aid of the accompanying drawings, proceed more fully to describe means employed by me.

Figure 2:
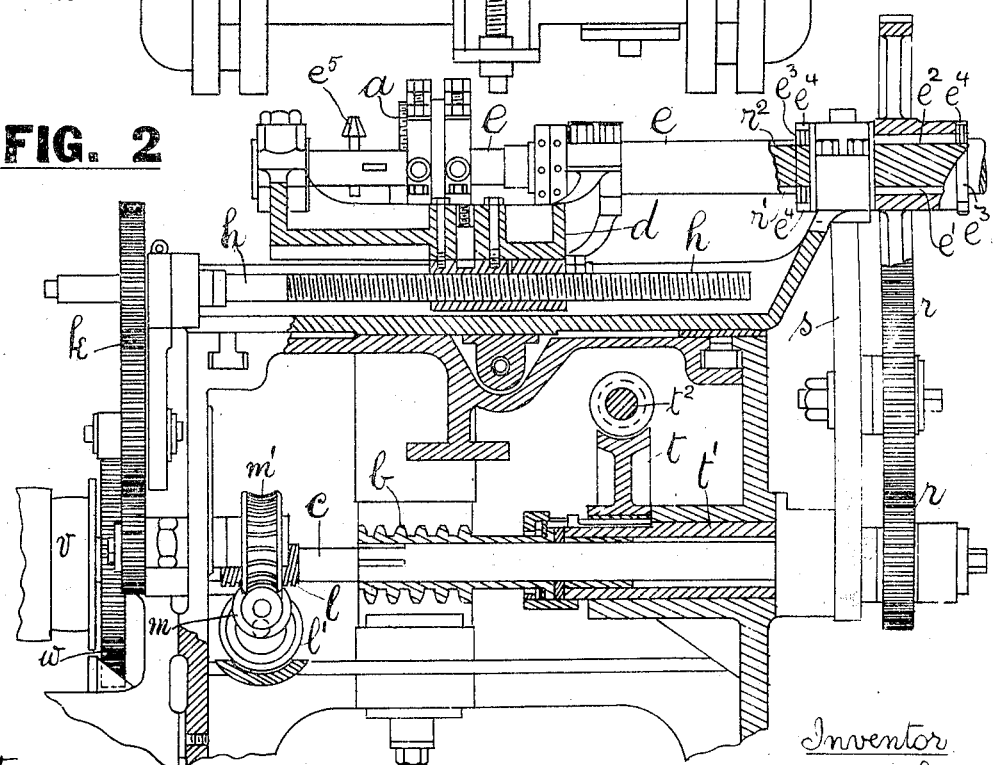

Figure 1 is a plan view, and Fig. 2 is a sectional elevation, of a worm-wheel-cutting machine arranged in accordance with one form of my invention. Figs. 3 and 4 are opposite end views of the machine, the former being in elevation and the latter being a cross-section, while Fig. 5 is an opposite end view to Fig. 3 in elevation, showing only so much as is necessary to illustrate the arrangement of gearing composed of trains of wheels referred to herein. In Figs. 1, 2, and 3 certain unimportant parts of the machine are broken away.

$a$ is the spindle, upon which the wheel to be cut is mounted, which spindle is here capable of being rotated by the worm $b$ on the driving-shaft $c$, such worm being in gear with the wheel $c'$, Fig. 4.

$d$ is a carriage or saddle carrying the cutter-bar $e$, between the jaws of which is mounted the cutter $e^5$ of the form herein referred to and which form has already been made use of in other worm-wheel-cutting machines. The traversing motion of the saddle $d$ is here shown attained by the use of a guide-screw $h$, on which the saddle is mounted.

The gearing operating the guide-screw consists of a train of wheels, such as at $k$, in connection with the main driving-shaft $c$ through pairs of worms and wheels $l$ $l'$ $m$ $m'$, Figs. 2 and 4.

To enable the worms and wheels last referred to to accommodate themselves to varying sizes of wheels in the train $k$, the bearing-bracket $n$, carrying $l'$ and $m$, is so mounted as to be capable of circular movement about the center of the shaft $c$, a curved slot $o$ being provided in the end of the main framing for the shaft carrying $m'$ and the gearwheel at the opposite end thereof. In Fig. 4 this end is attained by the bracket $n$ being attached to collars upon the shaft $c$ and upon the shaft carrying the wheel $m'$.

A second train of gear-wheels, as at $r$, for rotating the cutter-bar $e$ connects the latter with the driving-shaft $c$. In those cases wherein the swing-frame $s$ (whereby the various change-gears $r$ may be adjusted) requires considerable power to move the same about its center of turning I prefer to operate the same when desired by means of a worm-wheel quadrant $t$, here shown keyed to a bush $t'$, carrying the end of the swing-frame aforesaid, such quadrant being in gear with a worm upon a shaft $t^2$, to one of the ends of which (shown in Fig. 1) a handle may be conveniently fixed.

The machine is here shown capable of being driven from the main shaft $c$, the higher range of speeds being attained by the use of belt-pulleys $v$ $v$ in cone formation, while the lower range of speeds may be attained by the use of any ordinary well-understood system of back gearing, two wheels $w$ and $y$, forming part of such a system, being shown in the drawings.

The motion of the cutter on the cutter-bar $e$ may be likened unto that of a turning-screw in a fixed nut having "threads" of very small "pitch," and the ratio of the gearing between the cutter-bar and the wheel to be cut is equal to the ratio of the worm to the wheel with which it gears, increased or decreased (according to the manner in which the cutter is fed relatively to the direction of the wheel's motion) by the ratio, required "feed" per revolution of the wheel divided by the "lead," which latter for a single-threaded worm corresponds to the pitch of the worm-threads, or, in general terms, the lead is the distance measured along the axis of the worm between two corresponding points upon the same helical thread of such worm. The compound ratio referred to for a given worm and wheel varies with the amount of feed requisite, and the said feed is proportional to the rotary movement of the wheel itself.

In order to provide for the passage of the cutter-bar spindle through the uppermost wheel of the train $r$, I form the said spindle with keyways $r'$ $r^2$ for a sufficient part of its length and provide the wheels with keys $e'$ $e^2$, which are held in place by collars $e^3$ at each end beyond the bearings and to which collars the keys are attached by screws $e^4$, by which means I am able to keep the cutter-bar spindle the full diameter of the bore of the gear-wheel referred to and in a simple manner. In the drawings one of the keys $e'$ is shown flush with the spindle and the other projects into the boss of the gear-wheel.

Having now particularly described and ascertained the nature of my said invention and in what manner the same is to be performed, I declare that what I claim is—

In a worm-wheel-cutting machine, a carriage $d$, upon which the cutter-bar $e$ carrying the cutter $e^5$ is mounted, a screw-shaft $h$, connected with said carriage, a train of gear-wheels $k$ in connection with said screw-shaft, a train of gear-wheels $r$, in connection with cutter-bar $e$, a shaft $c$, connected to said train $r$, gearing $l$, $l'$, $m$, $m'$, connecting said shaft to said train of wheels $k$, a wheel-spindle $a$, and gearing $b$, $c'$, connecting said shaft $c$ with said spindle $a$, for the purpose and in manner substantially as herein shown and described.

WILLIAM BROWN McLEAN.

Witnesses:
GEORGE FREDERICK GADD,
ARTHUR GADD.